United States Patent
Fujiwara

(10) Patent No.: US 7,934,876 B2
(45) Date of Patent: May 3, 2011

(54) IMAGE PICKUP APPARATUS AND LENS DEVICE

(75) Inventor: Yuya Fujiwara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/645,650

(22) Filed: Dec. 23, 2009

(65) Prior Publication Data

US 2010/0158503 A1 Jun. 24, 2010

(30) Foreign Application Priority Data

Dec. 24, 2008 (JP) ................... 2008-327911

(51) Int. Cl.
*G03B 17/00* (2006.01)
(52) U.S. Cl. ....................................... 396/448
(58) Field of Classification Search .................. 396/448; 359/507, 511–513
See application file for complete search history.

(56) References Cited

U.S. PATENT DOCUMENTS 6,443,634 B1 * 9/2002 Tsuboi ........................ 396/448
7,037,007 B2 * 5/2006 Ohmori et al. ................ 396/448

FOREIGN PATENT DOCUMENTS

JP 2002-258133 A 9/2002
JP 2006-098486 A 4/2006

OTHER PUBLICATIONS

Specification and drawings of unpublished related co-pending U.S. Appl. No. 12/644,857, filed Dec. 22, 2009; "Image Pickup Apparatus and Lens Device"; Yuya Fujiwara; pp. 1-43; drawing sheets 1-15 figs. 1-28B.

* cited by examiner

*Primary Examiner* — W. B. Perkey
*Assistant Examiner* — Warren K Fenwick
(74) *Attorney, Agent, or Firm* — Rossi, Kimms & McDowell LLP

(57) ABSTRACT

An image pickup apparatus having a construction which enhances the degree of freedom in layout and enables size reduction. The image pickup apparatus includes a lens barrel and a barrier section for opening/closing the front face of the lens barrel. A barrier rotary shaft is disposed on a plane perpendicular to the optical axis of the lens barrel. The barrier section comprises two barrier groups, and each of the barrier groups comprises a central barrier configured to be driven for rotation about the barrier rotary shaft, and an outer barrier configured to rotate about the barrier rotary shaft in a direction identical to a direction of rotation of the central barrier in accordance with the rotation of the central barrier in a state superposed on the central barrier.

9 Claims, 15 Drawing Sheets

IMAGE PICKUP APPARATUS AND LENS DEVICE

BACKGROUND OF THE INVENTION

1. Field of the Invention

The present invention relates to an image pickup apparatus and a lens device, which are provided with a barrier for protecting the front face of a lens barrel.

2. Description of the Related Art

Conventionally, there have been proposed various types of barriers each for opening/closing the front face of a camera, so as to protect a photographic lens of the camera.

In image pickup apparatuses provided with barriers of the above-mentioned kind, most of the barriers have conventionally been configured to vertically or laterally open/close flat plates disposed in front of a lens barrel, as disclosed in Japanese Patent Laid-Open Publication No. 2006-98486.

Further, Japanese Patent Laid-Open Publication No. 2002-258133 discloses a technique in which a barrier, which is divided into an upper part and a lower part, is opened and closed along a dome-shaped path about a point on the axis of the lens barrel.

FIGS. 28A and 28B are perspective views of a conventional barrier mechanism disclosed in Japanese Patent Laid-Open Publication No. 2002-258133. FIG. 28A shows a state in which a barrier is closed, and FIG. 28B shows a state in which the barrier is open. This barrier is formed into a spherical shell shape having a center at a point on the optical axis of a lens (i.e. the point on the axis of the lens barrel). Further, as mentioned hereinbefore, the barrier is divided into an upper half barrier 62a and a lower half barrier, and these barriers can be rotated about respective rotary shafts (one of which is denoted by 68m) which are supported on bearings provided in laterally symmetrical relation on the opposite sides of the lens barrel and have the same rotational axis perpendicular to the optical axis and extending through the point on the optical axis.

Further, on the front face of the lens barrel, there is provided an opening/closing ring 21 for opening and closing the barrier, in a manner rotatable about the optical axis of the lens. When the opening/closing ring 21 is rotated, the upper half barrier 62a and the lower half barrier operate in respective opposite directions with respect to the optical axis, whereby the barrier is opened and closed.

However, the above-described conventional barrier is comprised of the upper half barrier 62a and the lower half barrier, and hence it is required to secure a large space for the upper half barrier 62a and the lower half barrier in the barrier open state, which is an obstacle to size reduction.

Further, the upper half barrier and the lower half barrier are configured to rotate about the same rotational axis, and hence, in a case where the upper half barrier and the lower half barrier are each further divided in two, i.e. the barrier is comprised of four barrier blades for size reduction, a rotary shaft provided at each of the left and right sides of the lens barrel requires a thickness corresponding to the four barrier blades. Therefore, the thickness of the barrier forms an obstacle to size reduction.

Furthermore, the barrier constructed as above needs a large rotary ring for driving the upper half barrier and the lower half barrier on the front side of the lens barrel, which lowers the degree of freedom in layout, and also becomes an obstacle to size reduction.

SUMMARY OF THE INVENTION

The present invention provides an image pickup apparatus and a lens device having a construction which enhances the degree of freedom in layout and enables size reduction.

In a first aspect of the present invention, there is provided an image pickup apparatus including a lens barrel, and a barrier section for opening and closing a front face of the lens barrel, comprising a barrier rotary shaft disposed on a plane perpendicular to an optical axis of the lens barrel, wherein the barrier section comprises a first driven barrier configured to be driven for rotation about the barrier rotary shaft, and a second driven barrier configured to rotate about the barrier rotary shaft in a direction identical to a direction of rotation of the first driven barrier in accordance with the rotation of the first driven barrier such that the first driven barrier and the second driven barrier are superposed one upon the other.

With the arrangement of the image pickup apparatus according to the first aspect of the present invention, the first driven barrier is driven to rotate about the barrier rotary shaft, and the second driven barrier following the rotation of the first driven barrier rotates about the barrier rotary shaft in the same direction such that the first driven barrier and the second driven barrier are superposed one upon the other. This makes it possible to save space in the barrier section in the barrier open state of the image pickup apparatus. Further, since it is not required to provide a rotary ring on the front face of the lens barrel, it is possible to increase the degree of freedom in layout, which contributes to size reduction.

In an image pickup apparatus according to an embodiment of the first aspect, a first barrier group rotates about a first barrier rotary shaft, and a second barrier group rotates about a second barrier rotary shaft. Therefore, it is possible to reduce thickness along the rotary shafts, which also contributes to size reduction.

In an image pickup apparatus according to an embodiment of the first aspect, the first barrier group and the second barrier group are rotated in the respective opposite directions by a driving device, which facilitates the opening and closing of the barrier section.

In an image pickup apparatus according to an embodiment of the first aspect, the second driven barrier located more remote from the optical axis rotates in accordance with the rotation of the first driven barrier located closer to the optical axis. This makes it possible to open and close the barrier section smoothly.

In an image pickup apparatus according to an embodiment of the first aspect, the barrier section is generally dome-shaped, and hence it is possible not only to protect the front face of the lens barrel securely, but also to achieve space saving.

In an image pickup apparatus according to an embodiment of the first aspect, the first driven barrier has a front surface thereof curved with the center of curvature at one point on the optical axis, which makes it possible to prevent a recess from being formed in the central part of the front surface of the barrier section to thereby make the appearance in the barrier closed state of the image pickup apparatus look natural.

In an image pickup apparatus according to an embodiment of the first aspect, the first driven barrier located closer to the optical axis is positioned closer to an object than the second driven barrier is. Therefore, even when a load is applied to a portion of the barrier section near the lens center in the barrier closed state of the image pickup apparatus, the barrier section can receive the load by the two barriers, which makes it possible to protect the lens more securely.

In an image pickup apparatus according to an embodiment of the first aspect, the second driven barrier has an outer end thereof formed with a rib having a height approximately equal to the thickness of the first driven barrier. This makes it possible to hide a clearance in a barrier closed state of the image pickup apparatus to thereby make the appearance look nice.

In a second aspect of the present invention, there is provided a lens device that is used in an optical apparatus, and includes a lens barrel, and a barrier section for opening and closing a front face of the lens barrel, comprising a barrier rotary shaft disposed on a plane perpendicular to an optical axis of the lens barrel, wherein the barrier section comprises a first driven barrier configured to be driven for rotation about the barrier rotary shaft, and a second driven barrier configured to rotate about the barrier rotary shaft in a direction identical to a direction of rotation of the first driven barrier in accordance with the rotation of the first driven barrier such that the first driven barrier and the second driven barrier are superposed one upon the other.

With the arrangement of the lens device according to the second aspect of the present invention, it is possible to obtain the same advantageous effects as provided by the image pickup apparatus of the first aspect of the present invention.

Further features of the present invention will become apparent from the following description of exemplary embodiments (with reference to the attached drawings).

DETAILED DESCRIPTION OF THE EMBODIMENTS

The present invention will now be described in detail below with reference to the accompanying drawings showing an embodiment thereof. An image pickup apparatus according to the embodiment is applied to a video camera.

Figure 1:
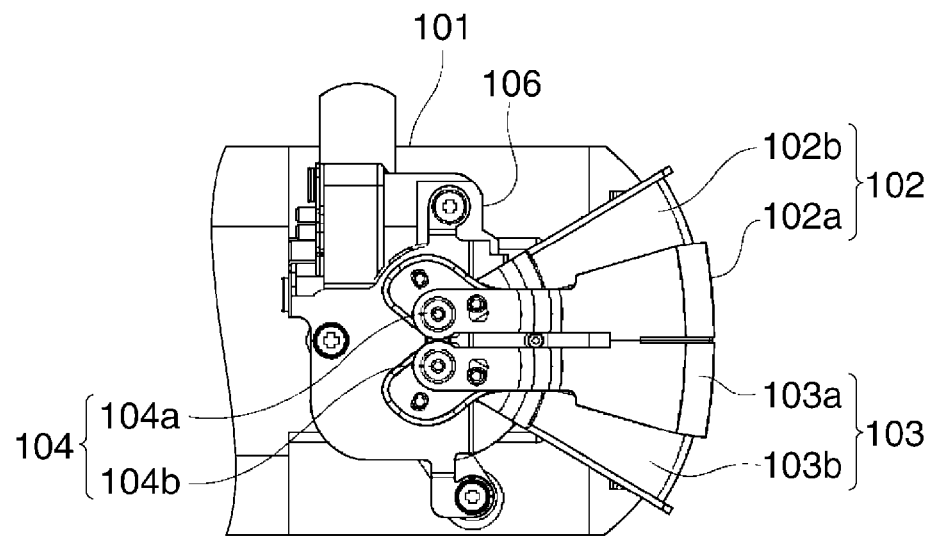
FIG. 1 is a view of essential parts of a video camera according to an embodiment of the present invention, in a barrier closed state thereof.
Figure 2:
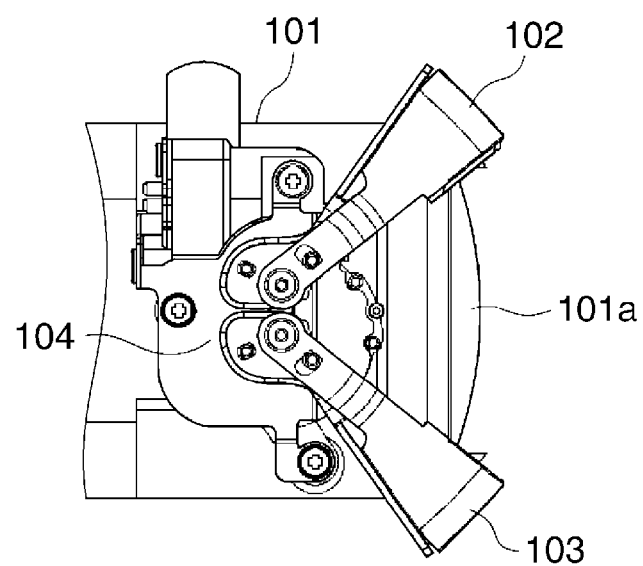
FIG. 2 is a view of the essential parts of the video camera in a barrier open state thereof.
Figure 3:
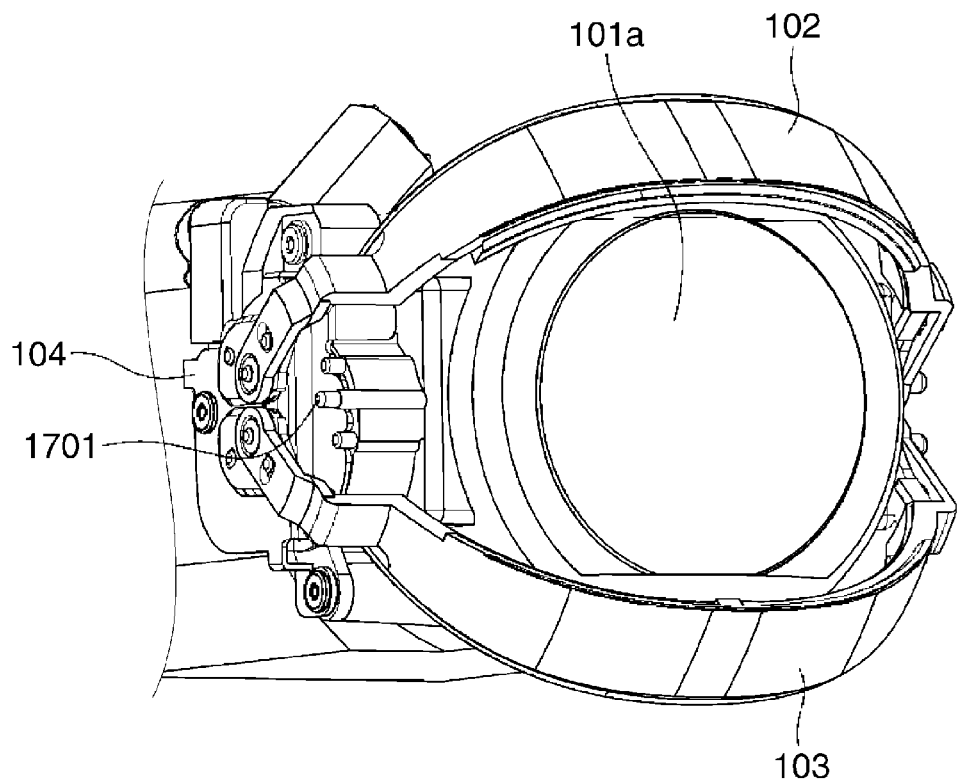
FIG. 3 is a perspective view of a lens barrel and a barrier section in the barrier open state of the video camera, as viewed obliquely from the front of the video camera.

FIGS. 1 and 2 are views of essential parts of the video camera according to the embodiment of the present invention. FIGS. 1 and 2 show a lens barrel and a barrier section in side view. The lens barrel has a photographic lens provided in the front thereof. The barrier section protects the front face of the lens barrel. FIG. 1 shows a barrier closed state, while FIG. 2 shows a barrier open state. In the present embodiment, an object side of the photographic lens provided in the lens barrel 101 is defined as a front side. FIG. 3 is a perspective view of the lens barrel and the barrier section in the barrier open state of the video camera, as viewed obliquely from the front of the video camera.

In front of the photographic lens, barrier groups 102 and 103 for forming the dome-shaped barrier section having a smoothly curved surface corresponding to a convex surface of the photographic lens from its periphery to a front surface are arranged such that the barrier groups 102 and 103 can be driven about barrier rotary shafts 104 projecting from a side surface of the lens barrel 101. The barrier rotary shafts 104 extend on a plane perpendicular to an optical axis of the lens barrel 101.

The barrier groups 102 and 103 can be selectively driven into the closed state for fully covering the lens front as shown in FIG. 1, and into the open state for allowing effective light flux to enter the photographic lens, as shown in FIG. 2.

The barrier rotary shafts 104 are formed by an upper barrier rotary shaft 104a (first barrier rotary shaft) and a lower barrier rotary shaft 104b (second barrier rotary shaft), which are disposed at respective locations symmetrical with respect to the optical axis of the lens as viewed from the side of the video camera. As will be described hereinafter with reference to FIG. 13, barrier rotary shafts 204 similar to these barrier rotary shafts 104 are provided on an opposite side of the lens barrel 101.

In the present embodiment, the upper barrier group 102 (first barrier group) and the lower barrier group 103 (second barrier group) forming the dome-shaped barrier section are each formed by two barrier blades. In other words, the dome-shaped barrier section is formed by the four barrier blades in total. In the present embodiment, a barrier 102a of the upper barrier group 102 and a barrier 103a of the lower barrier group 103 for covering a central part of the lens around the optical axis in the closed state will be referred to as "the central barrier (first driven barrier)". Further, barriers 102b and 103b for covering the outer part of the lens will be referred to as "the outer barrier (second driven barrier)".

Figure 4:
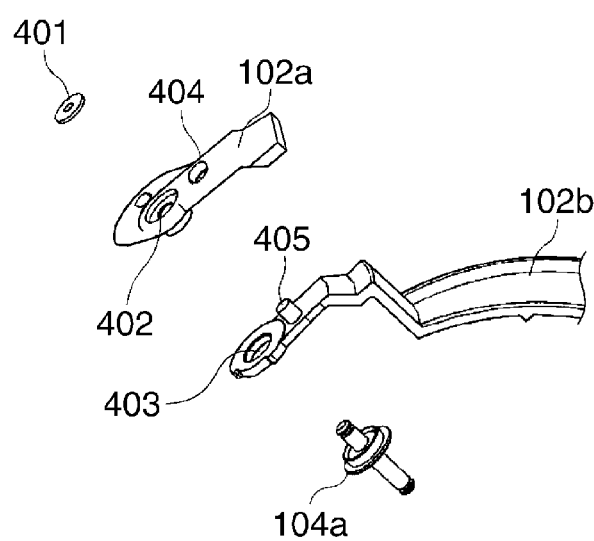
FIG. 4 is an exploded perspective view of the barrier section.

FIG. 4 is an exploded perspective view of the barrier section. The central barrier 102a and the outer barrier 102b have a hole 402 and a hole 403 formed through respective ends thereof, for having the upper barrier rotary shaft 104a rotatably fitted therein. The two upper barriers, i.e. the upper central barrier 102a and the upper outer barrier 102b have the upper barrier rotary shaft 104a inserted therethrough, and a retaining ring 401 prevents the two barriers 102a and 102b from falling off the upper barrier rotary shaft 104a. Similarly, the two lower barriers, i.e. the lower central barrier 103a and the lower outer barrier 103b are fitted on the lower barrier rotary shaft 104b, and a retaining ring prevents the two barriers 103a and 103b from falling off the lower barrier rotary shaft 104b.

The upper barrier group 102 and the lower barrier group 103 turn about the upper barrier rotary shaft 104a and the lower barrier rotary shaft 104b, respectively, through a predetermined angle in respective opposite directions as described hereinafter, whereby a lens opening/closing operation is performed. In short, the upper barrier group 102 turns upward, and the lower barrier group 103 turns downward, whereby a lens opening operation is performed.

In the upper barrier group 102, with a barrier opening/closing mechanism, described hereinafter, the upper central barrier 102a is moved upward to a position superposed on the upper outer barrier 102b, and is further moved upward together with the upper outer barrier 102b in a state superposed thereon until the upper barrier group 102 is brought into the open state, as shown in FIG. 2. Similarly, the lower central barrier 103a of the lower barrier group 103 is moved downward to a position superposed on the lower outer barrier 103b, and is further moved downward together with the lower outer barrier 103b in the superposed thereon until the lower barrier group 103 is brought into the open state. For this reason, in each of the upper and lower barrier groups, the central barrier disposed inward of the associated outer barrier is required to rotate through a larger rotational angle than the outer barrier, for opening or closing of the barrier section.

Next, a description will be given of the barrier opening/closing mechanism. As shown in FIG. 4, the central barrier 102a which is required to rotate through a larger rotational angle for opening/closing the barrier section has the end thereof formed with a slot 404. On the other hand, the outer barrier 102b has a shaft 405 projecting laterally from the end thereof. The shaft 405 is engaged with the slot 404 in a manner turnable within the same.

Figure 5:
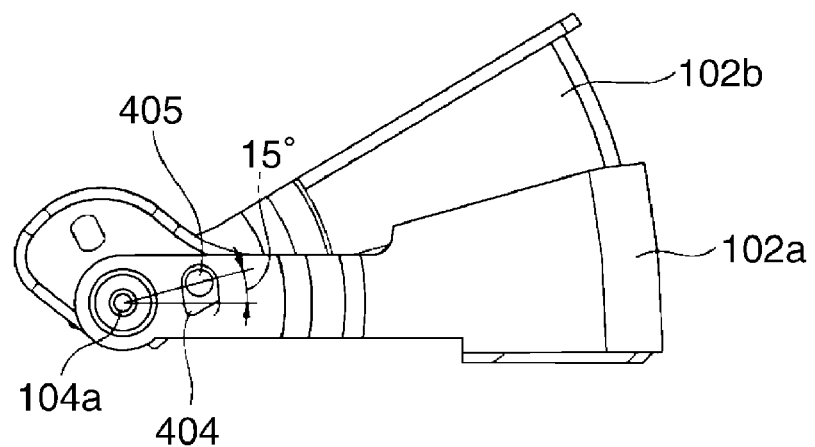
FIG. 5 is a view showing the position of an upper barrier group in the barrier closed state of the video camera.
Figure 6:
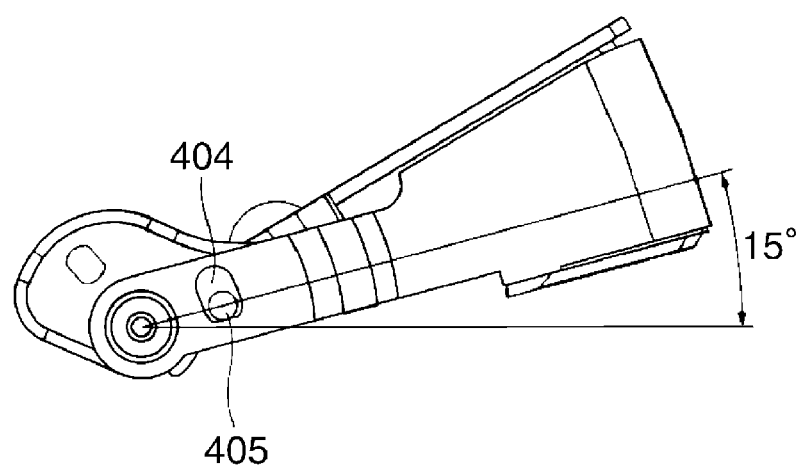
FIG. 6 is a view showing the position of the upper barrier group in an intermediate state in which only a central barrier is operating.
Figure 7:
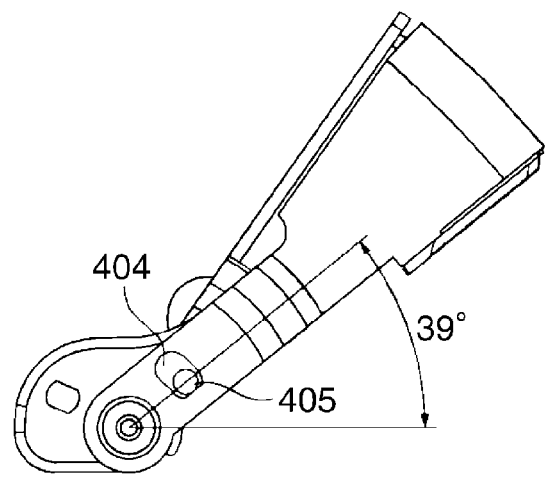
FIG. 7 is a view showing the position of the upper barrier group in the barrier open state of the video camera.

FIG. 5 is a view showing the position of the upper barrier group 102 in the barrier closed state of the video camera. FIG. 6 is a view showing the position of the upper barrier group 102 in an intermediate state in which only the central barrier is operating. FIG. 7 is a view showing the position of the upper barrier group 102 in the barrier open state of the video camera.

Hereafter, a description will be mainly given of a barrier mechanism for the upper barrier group 102, and the description applies to a barrier mechanism for the lower barrier group 103.

The diameter of the slot 404 formed in the end of the central barrier 102a is slightly larger than that of the shaft 405 extending from the end of the outer barrier 102b. The slot 404 has a shape that enables the central barrier 102a to rotate about the upper barrier rotary shaft 104a through an angle corresponding to the difference between a rotational angle required for opening and closing the outer barrier 102b and a rotational angle required for required for opening and closing the central barrier 102a.

For example, in the present example, the rotational angle required for opening the central barrier is set to 39°, and the rotational angle required for opening the outer barrier is set to 24°. Therefore, the slot 404 has a shape which enables the central barrier 102a to rotate through 15° which is the difference between the two angles (39°−24°=15°). The shaft 405 is formed on the end of the outer barrier such that the shaft 405 is positioned in an end of the slot 404 in the end of the central barrier in the barrier closed state of the video camera.

The slot 404 and the shaft 405 are formed in the central barrier 102a and on the outer barrier 102b, respectively, at the locations matching the above conditions, whereby the barrier section can be formed such that the outer barrier 102b is driven in accordance with the operation of the central barrier 102a, and when the video camera is in the barrier open state, the barrier group 102 is in a barrier-superposed state.

More specifically, in the barrier mechanism of the present embodiment, when the central barrier 102a rotates through 15° from the barrier closed state (see FIG. 5) to enter the intermediate state (see FIG. 6), the shaft 405 of the outer barrier 102b comes into contact with the other end of the slot 404 in the central barrier 102a. Thereafter, the upper barrier group 102 rotates through 24° with the central barrier 102a and the outer barrier 102b superposed one upon the other, into the barrier open state (see FIG. 7).

The central and outer barriers of the upper and lower barrier groups are caused to perform the motions described above about the upper and lower barrier rotary shafts by a drive section, described hereinafter, whereby the barrier opening/closing operation is performed.

The above-described construction makes it possible to realize a space-saving dome-shaped barrier section. Thus, the four separate barriers are divided into two barrier groups each formed by two barriers, and the two rotary shafts are provided for the respective barrier groups, whereby it is possible to reduce the thickness of the barrier section along the rotary shaft to thereby achieve size reduction.

Figure 8:
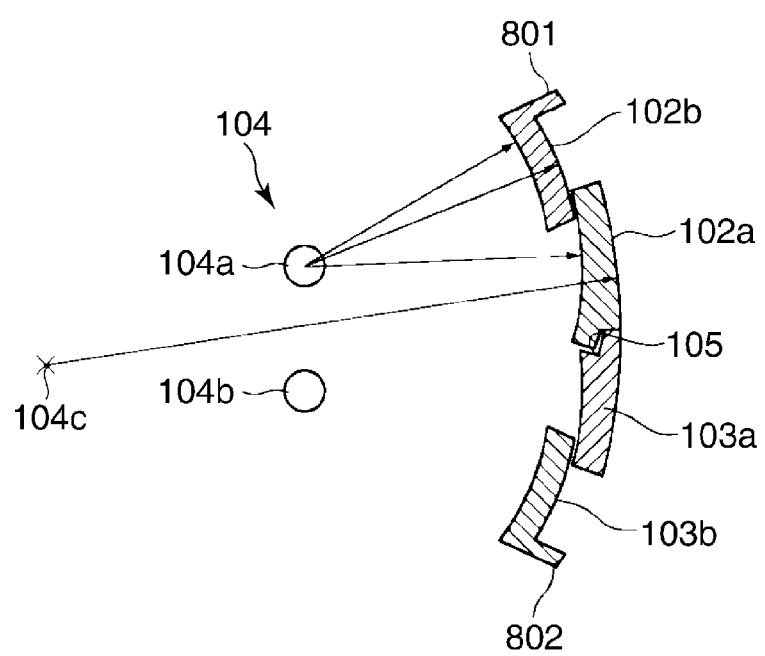
FIG. 8 is a cross-sectional view showing the shape of barrier groups forming the dome-shaped barrier section.

FIG. 8 is a cross-sectional view of the shape of the barrier groups forming the dome-shaped barrier section. FIG. 8 shows a cross section taken in the vertical direction orthogonal to the optical axis. Between contact surfaces of the central barrier 102a and the outer barrier 102b adjacent to each other and between those of the central barrier 103a and the outer barrier 103b, there are formed required minimum clearances, respectively, so as to realize space saving of the barrier section by causing the barriers to be superposed one upon the other in the barrier open state of the video camera. The barrier groups form a dome-shaped face with the barrier rotary shafts 104 (104a and 104b) as respective centers.

The front surfaces of the respective central barriers 102a and 103a of the barrier section in the present embodiment are curved with the center of curvature located at one point 104c (indicated by a mark "X" in FIG. 8) on the optical axis.

Figure 9:
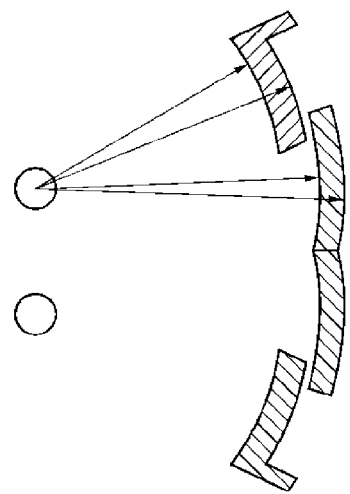
FIG. 9 is a cross-sectional view showing the shape of the barrier groups obtained when all surfaces of the barrier groups are formed to form dome shapes using barrier rotary shafts as rotational axes.

For example, as shown in FIG. 9, assuming that the surfaces of the respective barriers of each barrier group are formed into a dome shape with the associated barrier rotary shaft 104a or 104b as its center, the front surface of the barrier section as an appearance surface have a recess formed in the central portion thereof and hence look unnatural.

To solve this problem, in the present embodiment, the central barrier of each of the barrier groups is formed to have the front surface thereof curved with the center of curvature located at the point 104c on the optical axis, as shown in FIG. 8. This makes it possible to prevent a recess from being formed in the central portion of the barrier section to thereby make the appearance of the barrier section look natural in the barrier closed state of the video camera.

Further, the barrier group in the present embodiment is configured such that in the barrier open state of the video camera, the central barrier is positioned in front of the outer barrier in a superposed state, and in the barrier closed state of the same as well, an outer end of the central barrier and an inner end of the outer barrier are superposed one upon the other in front of the lens. Thus, even when a load is applied toward the central portion of the lens in the barrier closed state of the video camera, it is possible to receive the load by the two barriers, so that the lens can be protected more securely.

Figure 10:
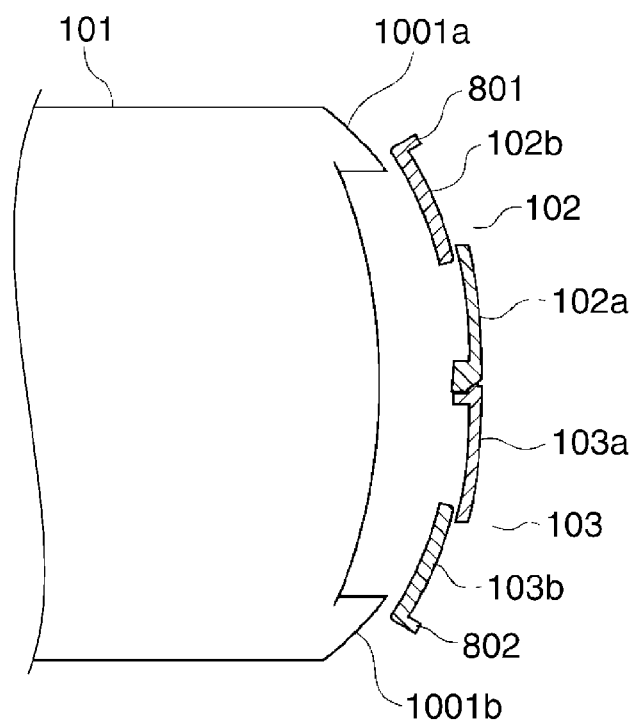
FIG. 10 is a schematic view of the arrangement of the lens barrel and the barrier groups.
Figure 11:
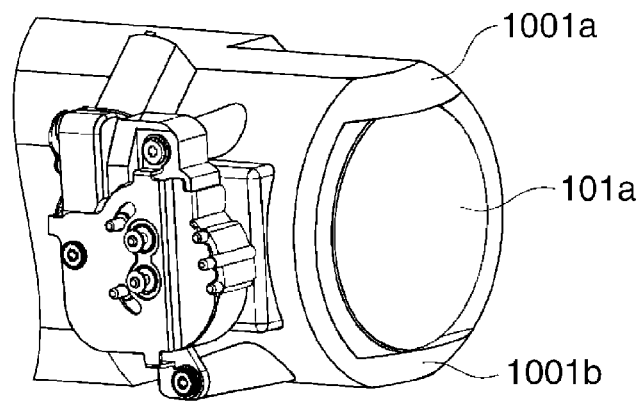
FIG. 11 is a perspective view of essential parts of a barrier mechanism in the barrier open state of the video camera.

FIG. 10 is a schematic view of the arrangement of the lens barrel 101 and the barrier groups 102 and 103. FIG. 11 is a perspective view of essential parts of the barrier mechanism in the barrier open state of the video camera. In the barrier mechanism of the present embodiment, the lens barrel 101 is formed with outer barrier receiving parts 1001a and 1001b. Each of the receiving parts 1001a and 1001b has a shape offset from the rear surface of the associated outer barrier by a slight clearance required for driving. A static pressure load applied to the barriers in the barrier closed state of the video camera can be received by the receiving parts 1001a and 1001b. This makes it possible to protect a front lens 101a of the lens barrel 101 more securely without scratching the same.

Further, a rib 801 (802) having a height approximately equal to the thickness of the central barrier 102a (103a) is formed on the outer end of the outer barrier 102b (103b).

Figure 12:
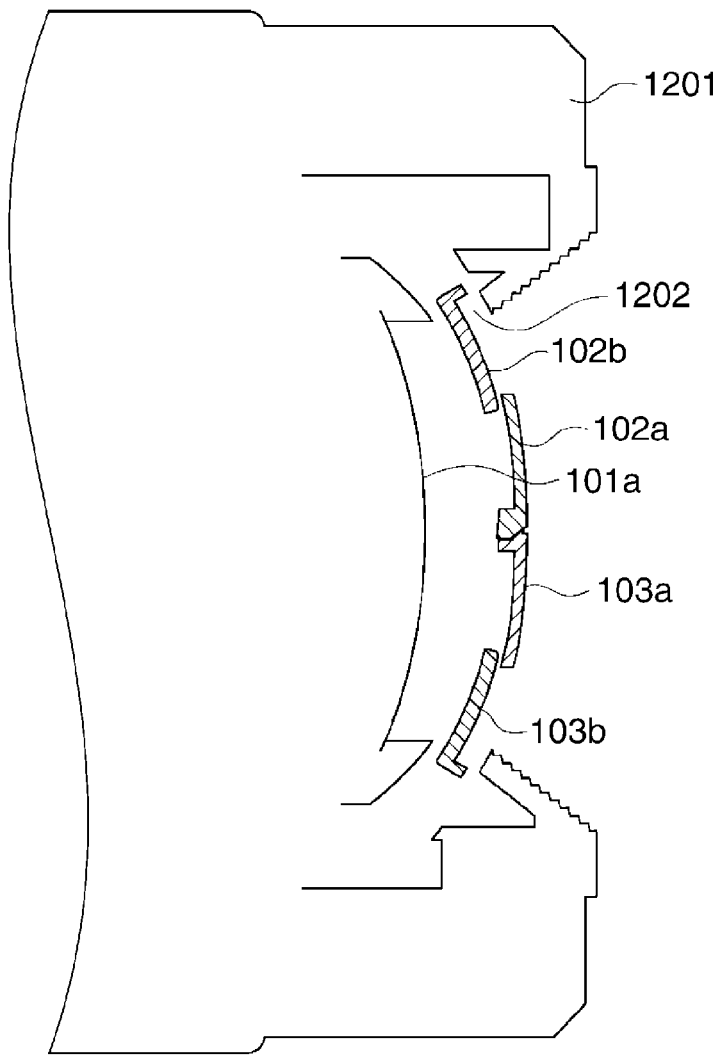
FIG. 12 is a cross-sectional view of the arrangement of the lens barrel, the barrier groups, and a body cover.

FIG. 12 is a cross-sectional view of the arrangement of the lens barrel 101, the barrier groups 102 and 103, and a body cover 1201. The body cover 1201 is required to accommodate a barrier opening/closing path. For this reason, a clearance 1202 between the body cover 1201 and the front surface of each outer barrier is determined by each of the central barriers 102a and 103a which move along an outermost path. In short, the clearance 1202 created in the barrier closed state of the video camera is approximately equal to a distance between the front surface of the out barrier and the front surface of the central barrier. Therefore, the rib 801 (802) having the height approximately equal to the thickness of the central barrier 102a (103a) is formed on the outer end of the outer barrier 102b (103b), whereby it is possible to hide the clearance in the barrier closed state of the video camera to thereby improve the appearance of the video camera.

Figure 13:
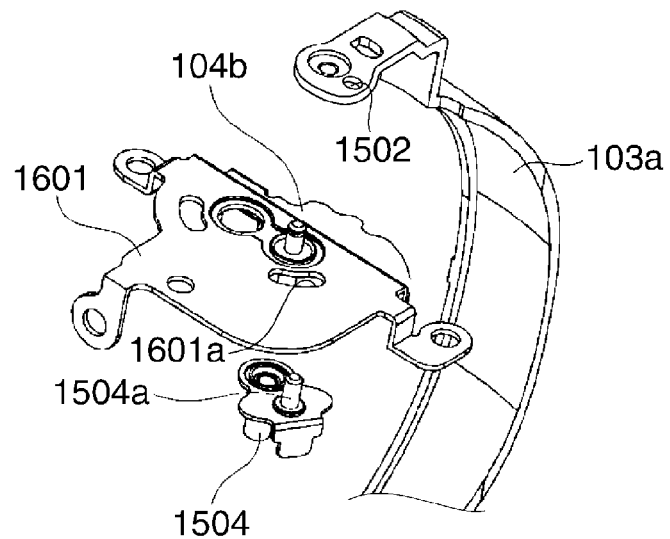
FIG. 13 is an exploded perspective view of a lower central barrier and a barrier arm.

FIG. 13 is an exploded perspective view of the lower central barrier 103a and a barrier arm 1504. The central barrier 103a is formed with a hole 1502 for connection with the barrier arm 1504 connected to a drive source described hereinafter. A shaft 1504a projecting from an end of the barrier arm 1504 is fitted in the hole 1502 of the central barrier 103a via a sheet metal member 1601 having the barrier rotary shaft 104b after inserting the shaft 1504a through an elongated arcuate hole 1601a of the sheet metal member 1601, whereby the barrier arm 1504 and the central barrier 103a are unitized.

Figure 14:
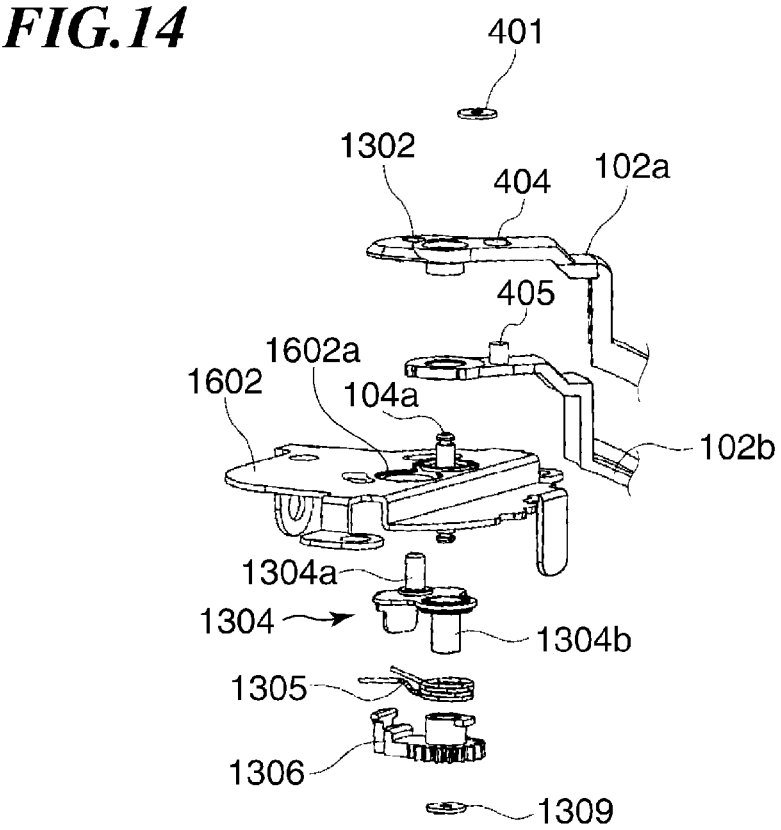
FIG. 14 is an exploded perspective view of a shaft-associated assembly portion including an upper barrier rotary shaft.

This construction applies to the upper central barrier 102a and a barrier arm 1304 (see FIG. 14). More specifically, the central barrier 102a is formed with a hole 1302 for connection with the barrier arm 1304. A shaft 1304a projecting from an end of the barrier arm 1304 is fitted in the hole 1302 of the central barrier 102a via a sheet metal member 1602 having the barrier rotary shaft 104a after inserting the shaft 1304a through an elongated arcuate hole 1602a of the sheet metal member 1602, whereby the barrier arm 1304 and the central barrier 102a are unitized.

The barrier arm 1504 (1304) connected to the drive source, described hereinafter, is connected to the central barrier 103a (102a) as described above, so that in the assembling process, it is possible to assemble the C-shaped central barrier 103a (102a) after checking the operation of the drive source, to thereby reduce occurrence of assembly failure.

Figure 15:
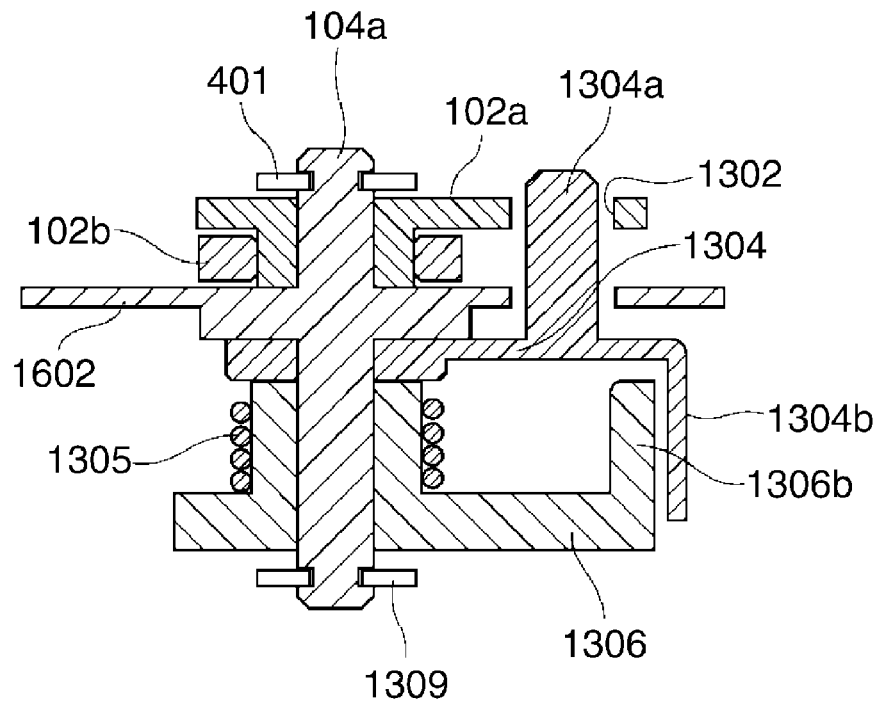
FIG. 15 is a cross-sectional view of the shaft-associated assembly portion including the upper barrier rotary shaft.

FIG. 14 is an exploded perspective view of a shaft-associated assembly portion including the upper barrier rotary shaft 104a. Further, FIG. 15 is a cross-sectional view of the shaft-associated assembly portion including the upper barrier rotary shaft 104a. This shaft-associated assembly portion is basically comprised of portions of the upper barrier group 102, the barrier arm 1304, a gear-equipped member 1306, described hereinafter, and a toggle spring 1305 as an elastic member.

The barrier arm 1304 is provided in a coaxially rotatable relation with the upper barrier rotary shaft 104a. On one surface of the sheet metal member 1602 from which the upper barrier rotary shaft 104a projects, the upper central barrier 102a and the outer barrier 102b are placed one upon the other by having the upper barrier rotary shaft 104a inserted therethrough, and the retaining ring 401 is fitted on the barrier rotary shaft 104a to prevent the central barrier 102a and the outer barrier 102b from coming off.

On the other surface of the sheet metal member 1602, there are mounted the barrier arm 1304 that has the upper barrier rotary shaft 104a inserted therein, the gear-equipped member 1306, referred to hereinafter, and the toggle spring 1305, referred to hereinafter, and a retaining ring 1309 is fitted on the barrier rotary shaft 104a to prevent the members 1304, 1305, and 1306 from coming off.

The member 1306 mounted on the upper barrier rotary shaft 104a has a spur gear 1306a (see FIG. 16) which rotates about the upper barrier rotary shaft 104a. The pitch diameter of the spur gear 1306a is set to a value equal to a distance between the two barrier rotary shafts 104a and 104b. The barrier arm 1304, the member 1306, and the toggle spring 1305 are examples of transmission members for transmitting rotation of the spur gear 1306a to the upper barrier group 102 having the upper barrier rotary shaft 104a inserted therethrough.

Figure 19:
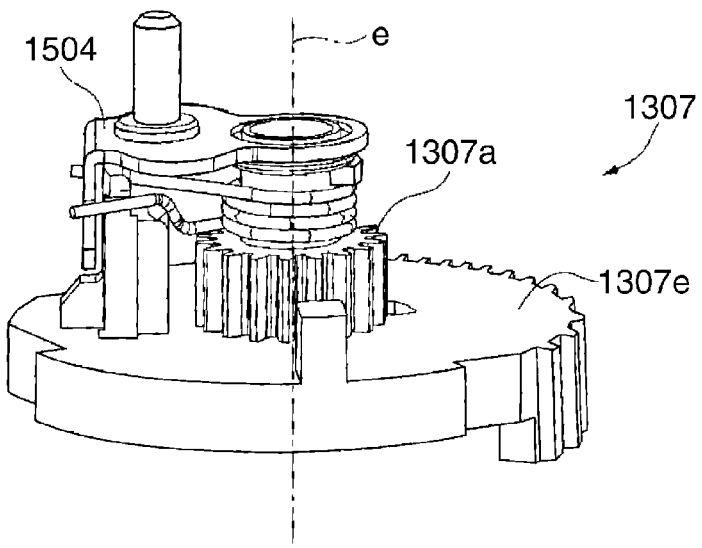
FIG. 19 is a perspective view of a member which rotates about a lower barrier rotary shaft.

A shaft-associated assembly portion including the lower barrier rotary shaft 104b is also provided with a member 1307 having a spur gear 1307a which rotates about the center of rotation of the lower barrier group 103, and is identical in construction to the shaft-associated assembly portion including the upper barrier rotary shaft 104a (see FIG. 19). The member 1307 is an example of a transmission member for transmitting rotation of the spur gear 1307a to the lower barrier group 103 having the lower barrier rotary shaft 104b inserted therethrough.

The spur gear 1307a of the member 1307, which rotates about the center of rotation of the lower barrier group 103, also has a pitch diameter set to the value equal to the distance between the two barrier rotary shafts 104a and 104b. The spur gears 1306a and 1307a mounted on the respective upper and lower barrier rotary shafts 104a and 104b and connected to each other are of the same module and have the same number of teeth.

With this construction, it is possible to drive one of the adjacent spur gears 1306a and 1307a connected to each other, to thereby rotate the upper and lower barrier groups 102 and 103 about the respective barrier rotary shafts 104a and 104b in opposite directions, respectively. As a consequence, the upper barrier group 102 and the spur gear 1306a connected to the drive source, described hereinafter, can be rotated coaxially, which makes it possible to realize an efficient barrier mechanism which is capable of reducing loss in driving force transmission.

Further, the gear-equipped member 1306 and the barrier arm 1304 mounted on the upper barrier rotary shaft 104a have respective projecting arms 1306b and 1304b formed at respective locations circumferentially displaced from the barrier rotary shaft 104a.

Figure 16:
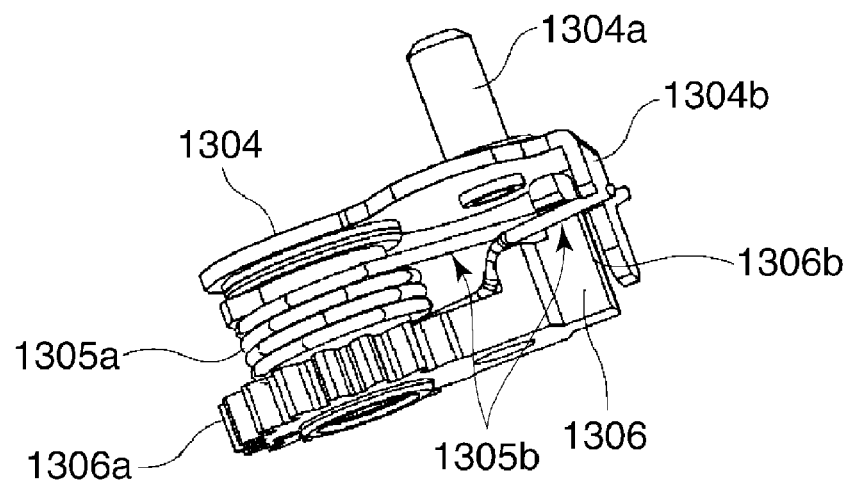
FIG. 16 is a perspective view of the shaft-associated assembly portion including the upper barrier rotary shaft.

FIG. 16 is a perspective view of the shaft-associated assembly portion including the upper barrier rotary shaft 104a. As described hereinbefore, this shaft-associated assembly portion is provided with the gear-equipped member 1306, the barrier arm 1304, and the toggle spring 1305. In the barrier mechanism of the present embodiment, the gear-equipped member 1306 is inserted through a coil 1305a of the toggle spring 1305 and is thereby equipped with the coil 1305a. At this time, arms 1305b of the toggle spring 1305 extending as opposite end portions of the same are positioned in a manner sandwiching the projecting arm 1306b of the spur gear 1306a and the projecting arm 1304b of the barrier arm 1304.

Thus, the central barrier 102a made integral with the barrier arm 1304 and the gear-equipped member 1306 are connected to each other via the toggle spring 1305 as an elastic member, whereby a play in rotation and a phase displacement between the gears, which are inevitable to gear operation, are absorbed. Further, it is possible to preload the toggle spring 1305 in both the barrier open state and the barrier closed state, as described hereinafter.

Figure 17:
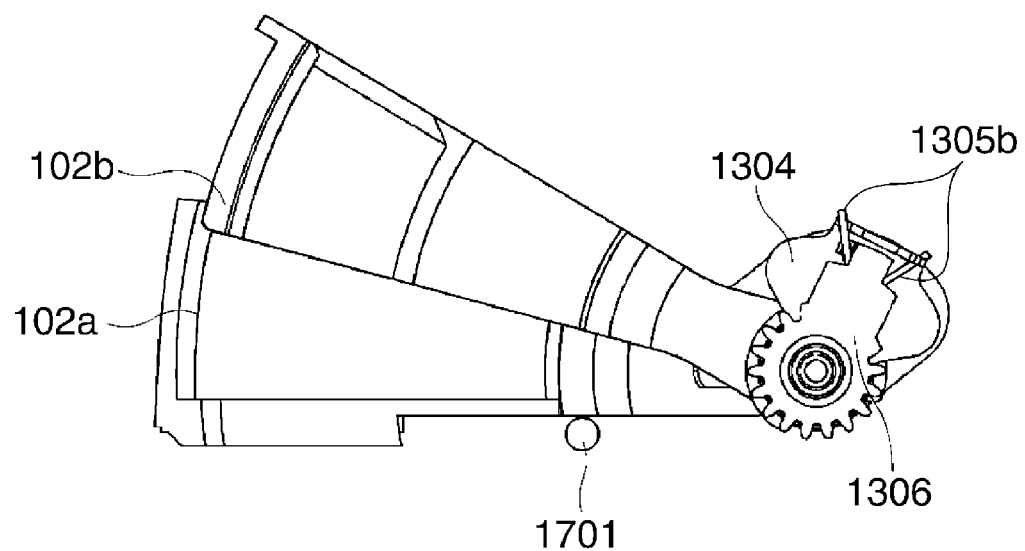
FIG. 17 is a view of the upper barrier group and the shaft-associated assembly portion including the upper barrier rotary shaft in the barrier closed state of the video camera when a toggle spring is not preloaded.
Figure 18:
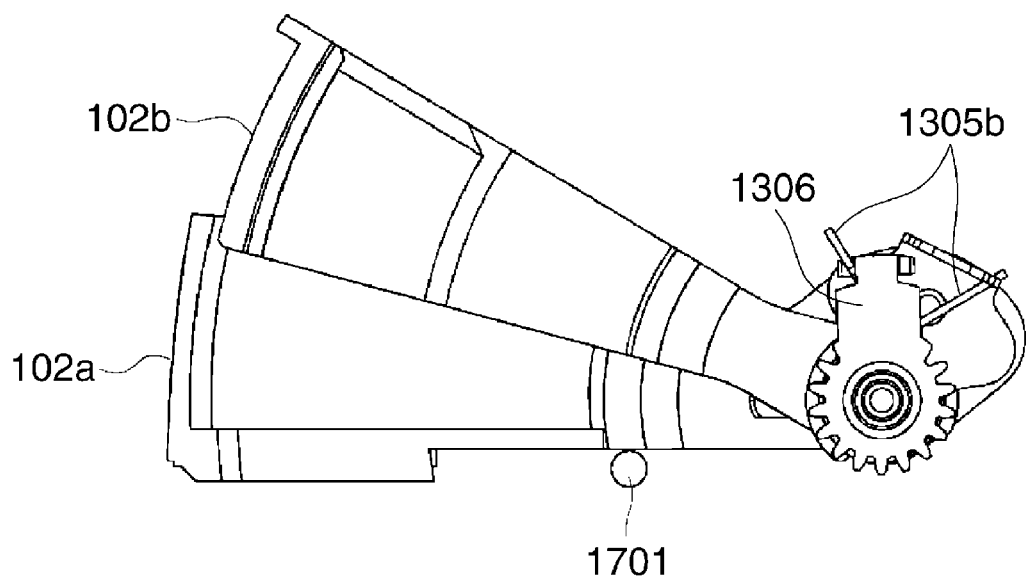
FIG. 18 is a view of the upper barrier group and the shaft-associated assembly portion including the upper barrier rotary shaft in the barrier closed state of the video camera when the toggle spring is preloaded.

Next, a description will be given of preloading of the toggle spring 1305 in the barrier closed state of the video camera. FIG. 17 is a view of the upper barrier group 102 and the shaft-associated assembly portion including the upper barrier rotary shaft 104a in the barrier closed state of the video camera before the toggle spring 1305 is preloaded. FIG. 18 is a view of the upper barrier group 102 and the shaft including the upper barrier rotary shaft 104a in the barrier closed state of the video camera when the toggle spring 1305 is preloaded.

When the gear-equipped member 1306 and the barrier arm 1304 driven in unison with the central barrier 102a rotate through an angle corresponding to a rotational angle required by the central barrier 102a, the central barrier 102a is brought into contact with a stopper 1701 formed on the lens barrel 101, as shown in FIG. 17. This stops the driving of the central barrier 102a and the barrier arm 1304.

Thereafter, when the gear-equipped member 1306 is further rotated from the FIG. 17 state in which the driving of the barrier arm 1304 is stopped, the winding of the toggle spring 1305 is tightened as shown in FIG. 18. This preloads the toggle spring 1305 in a barrier closing direction. Preloading of the toggle spring 1305 charging in a barrier opening direction is performed by reversing the operation. The lower barrier group 103 is identical in construction to the upper barrier group 102, and therefore it is possible to generate a preloaded force of the toggle spring 1305 in both the barrier open state and the barrier closed state.

With the construction described hereinbefore, by driving one of the spur gears, it is possible to drive the four barrier blades (the central barriers 102a and 103a and the outer barriers 102b and 103b) of the barrier section such that the barriers 102a and 102b and the barriers 103a and 103b are rotated in the respective opposite directions, to thereby open or close the barrier section.

FIG. 19 is a perspective view of a member which rotates about the lower barrier rotary shaft 104b. In FIG. 19, a one-dot-chain line e indicates the axis of the lower barrier rotary shaft 104b. In the present embodiment, the gear-equipped member 1307 which rotates about the lower barrier rotary shaft 104b is formed as a double-geared wheel in which the spur gear 1307a and a first worm wheel 1307e which rotates about the same rotational axis as that of the spur gear 1307a are integrated with each other. The member 1307 transmits a driving force from a motor 2001 as the drive source to the lower barrier group 103 having the lower barrier rotary shaft 104b inserted therein.

Figure 20:
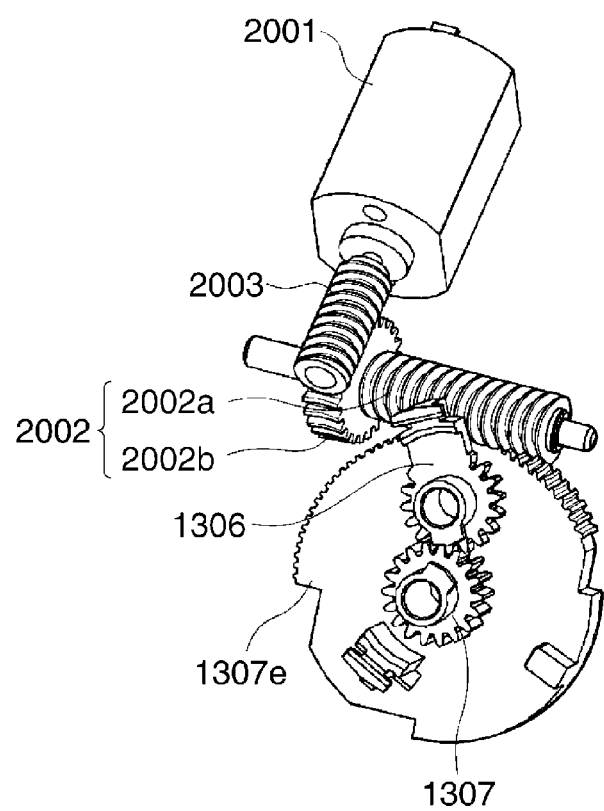
FIG. 20 is a perspective view of a gear section of a motor as a drive source.

FIG. 20 is a perspective view of a gear section of the motor as the drive source. The motor 2001 is electrically connected to a control circuit board, referred to hereinafter, via a flexible printed wiring board, not shown. When electric power is supplied via the flexible printed wiring board, the shaft of the motor 2001 performs rotation. The rotary shaft of the motor 2001 has a second worm gear 2003 mounted thereon.

The first worm wheel 1307e is driven by a first worm gear 2002. The first worm gear 2002 has a double-geared structure formed by a worm section 2002a and a wheel section 2002b. The first worm gear 2002 is driven by the second worm gear 2003 supported on the shaft of the motor 2001.

In this case, the rotary shaft of the worm section 2002a only has to extend in a direction orthogonal to the rotary shaft of the first worm wheel 1307e. Therefore, the motor 2001 can be connected to the first worm wheel 1307e which rotates about the lower barrier rotary shaft 104b, via a combination of at least two worm gears and a wheel, which makes it possible to enhance the degree of freedom in positioning the motor.

Figure 21:
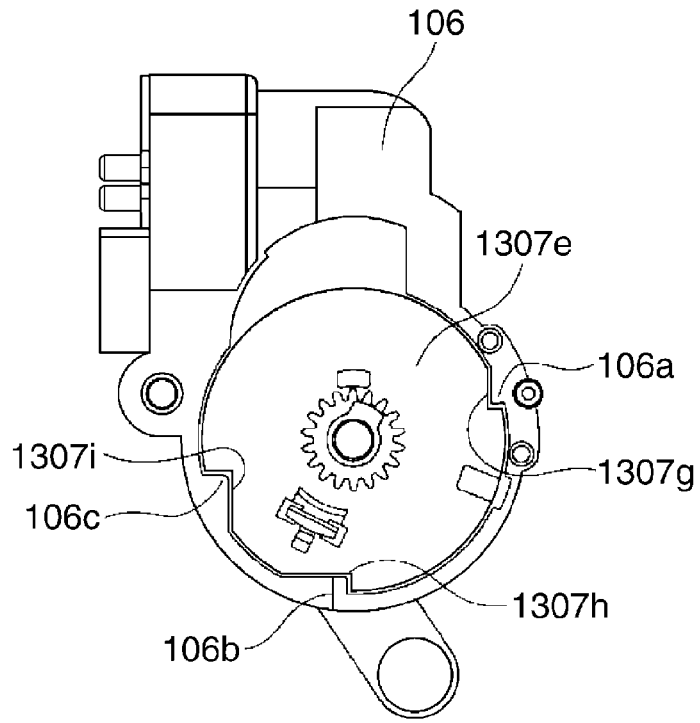
FIG. 21 is a view showing positional relationship between a gear-equipped member and a drive section holder during assembly thereof.
Figure 22:
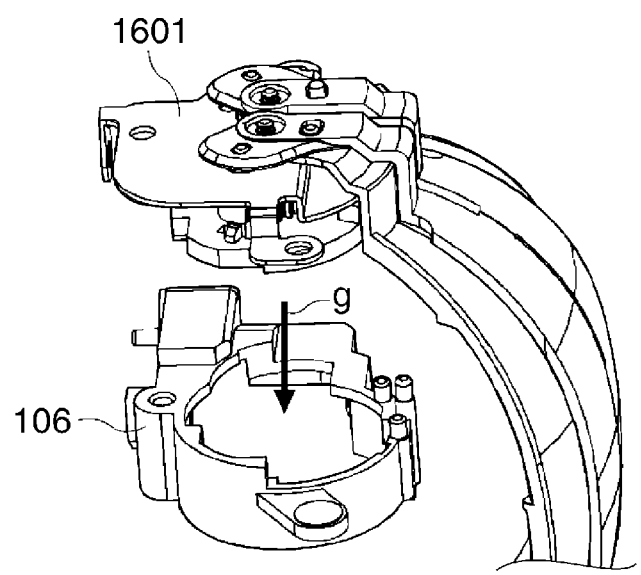
FIG. 22 is a perspective view showing how the gear-equipped member is mounted to the drive section holder.

FIG. 21 is a view showing the positional relationship between the gear-equipped member 1307 and the drive section holder 106 during assembly thereof. FIG. 22 is a perspective view showing how the gear-equipped member 1307 is mounted to the drive section holder 106. An arrow g in FIG. 22 indicates an assembling direction.

As shown in FIG. 21, the first worm wheel 1307e which rotates about the lower barrier rotary shaft 104b has an outer peripheral portion thereof formed with recesses 1307g, 1307h, and 1307i. On the other hand, the drive section holder 106 has protrusions 106a, 106b, and 106c formed on an inlet thereof at locations corresponding to the respective recesses 1307g, 1307h, and 1307i. Each recess and each protrusion associated therewith are shaped such that they are associated with each other, like a key and a keyhole, in positional relation, when assembled. In the barrier mechanism of the present embodiment, the recesses and the protrusions fit to each other in the barrier closed state of the video camera.

Further, in the barrier mechanism of the present embodiment, the barrier section is mounted to the drive section holder 106 as follows: Components including the gear-equipped member 1307 are assembled to the sheet metal member 1601 having the lower barrier rotary shaft 104b inserted therethrough, whereby the components, the sheet metal member 1601, and the lower barrier rotary shaft 104b are formed into a unit. Then, the unit is mounted in the drive section holder 106 in the direction indicated by the arrow g in FIG. 22. At this time, since the recesses and the protrusions mentioned above are provided, it is possible to assemble the barrier section such that the gear-equipped member 1307 is in a phase corresponding to the barrier closed state in the inlet of the drive section holder 106. In the present embodiment, the unit accommodated in the drive section holder 106, the motor 2001, and so forth form a driving device for rotating the upper and lower barrier groups.

Further, in the barrier section of the present embodiment, first, the lower barrier group 103 is driven in accordance with rotation of the gear-equipped member 1307 driven by the motor 2001 as the drive source. On the other hand, the upper barrier group 102, which is driven by the gear-equipped member 1306 for rotation, starts to operate at least simultaneously with driving of the lower barrier group 103 or with a delay of a time period corresponding to a play in rotation between the gears.

To cope with this problem, in the barrier section of the present embodiment, the central barrier 103*a* of the lower barrier group 103 has a portion formed with a rabbet 105 which is superposed on an associated portion of the central barrier 102*a* of the upper barrier group 102 in the optical axis direction, in the barrier closed state of the video camera. In particular, the rabbet 105 is formed such that the central barrier 103*a* of the lower barrier group 103 is positioned in front (i.e. on an object side).

In the barrier section of the present embodiment, the lower barrier group 103 starts to operate earlier than the upper barrier group 102 as mentioned before. Therefore, by forming the rabbet 105 in the central barrier 103*a* of the lower barrier group 103 such that it is positioned forward, whereby the rabbet is prevented from being undesirably caught.

Figure 23:
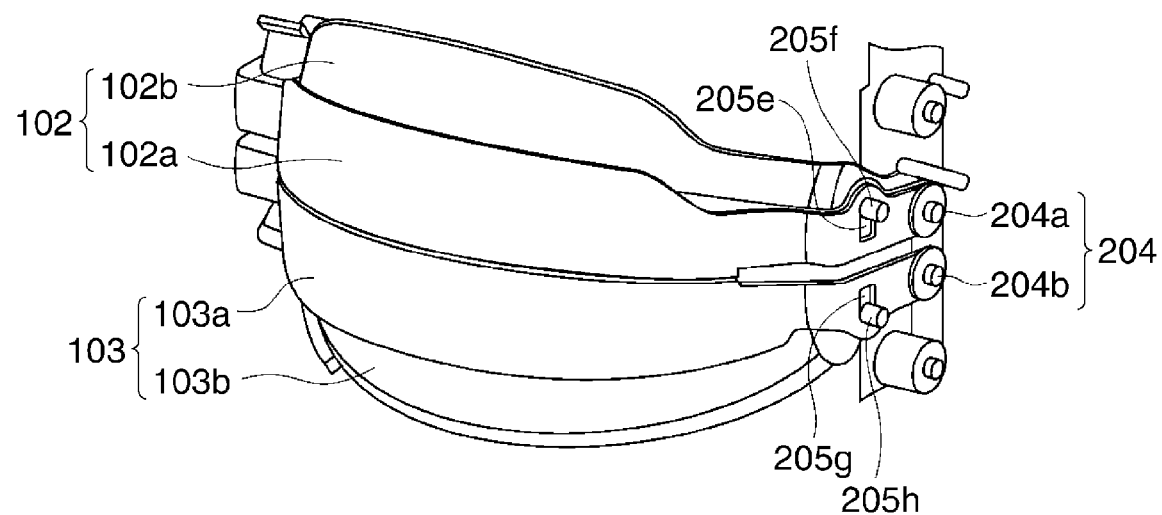
FIG. 23 is a view of shaft-associated assembly portions located on an opposite side of the lens barrel from the shaft-associated assembly portions including the above-mentioned barrier rotary shafts.

FIG. 23 is a view of shaft-associated assembly portions located on an opposite side of the lens barrel from the shaft-associated assembly portions including the above-mentioned barrier rotary shafts 104. On the opposite side of the lens barrel 101 from the above-described barrier rotary shafts 104, there are provided barrier rotary shafts 204 for supporting the barrier groups 102 and 103 in a manner capable of driving them. Each barrier rotary shaft 204 shares the same axis with the associated barrier rotary shaft 104.

The barrier rotary shafts 204 are formed by an upper barrier rotary shaft 204*a* and a lower barrier rotary shaft 204*b*. Each of the upper central and outer barriers 102*a* and 102*b* has an end thereof rotatably connected to the upper barrier rotary shaft 204*a*. Further, the upper central barrier 102*a* is formed with a guide hole 205*e*, and a pin 205*f* for engagement with the guide hole 205*e* projects from the upper outer barrier 102*b*. With this construction, the amount of rotation of the upper central barrier 102*a* with respect to the upper outer barrier 102*b* is restricted to a predetermined amount.

Similarly, each of the lower central and outer barriers 103*a* and 103*b* has an end thereof rotatably connected to the lower barrier rotary shaft 204*b*. Further, the lower central barrier 103*a* is formed with a guide hole 205*g*, and a pin 205*h* for engagement with the guide hole 205*g* projects from the lower outer barrier 103*b*. With this construction, the amount of rotation of the lower central barrier 103*a* with respect to the lower outer barrier 103*b* is restricted to the predetermined amount.

The drive source is connected to the barrier rotary shafts 104 as described hereinbefore, but the barrier rotary shafts 204 on the opposite side from the barrier rotary shaft 104 are not connected to the drive source. Therefore, the upper barrier rotary shaft 204*a* and the lower barrier rotary shaft 204*b* only serve to rotatably support the upper barrier group 102 and the lower barrier group 103, respectively. It is to be understood that the barrier rotary shafts 204 may be also connected to the drive source, similarly to the barrier rotary shafts 104, and the barrier rotary shafts 104 and 204 may be driven in synchronism with each other to perform the opening/closing operation of the barrier section.

Figure 24:
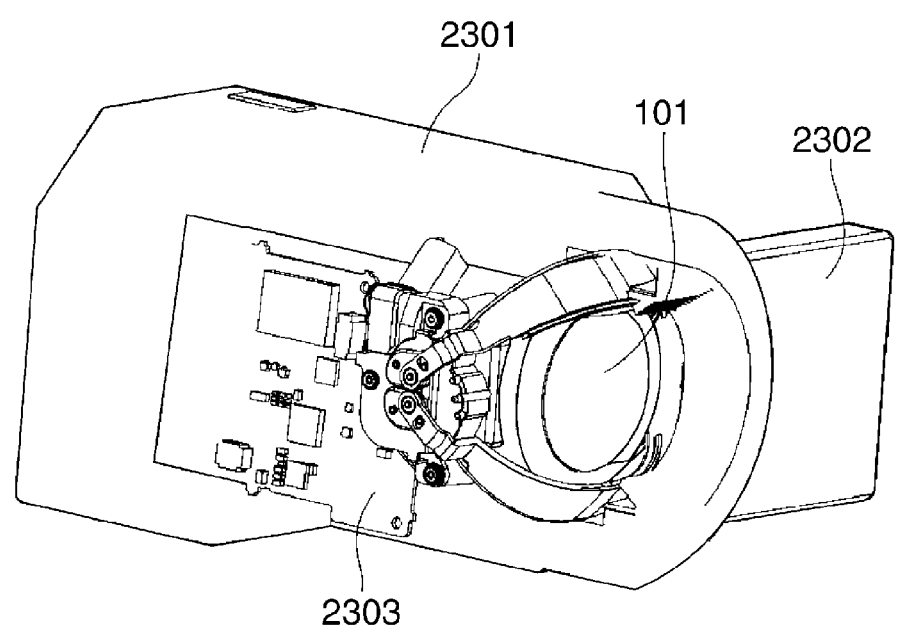
FIG. 24 is a transparent view of the internal construction of the video camera in the barrier open state thereof.
Figure 25:
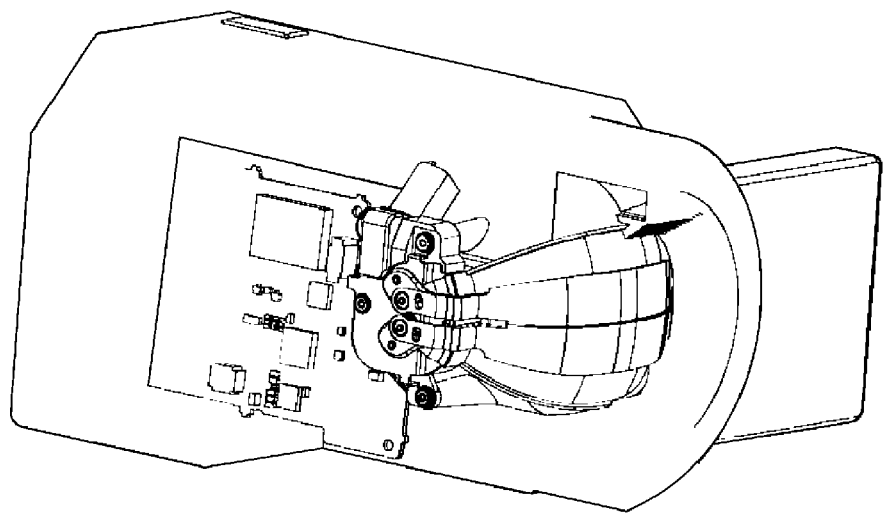
FIG. 25 is a transparent view of the internal construction of the video camera in the barrier closed state thereof.

Next, a description will be given of the operation of the video camera provided with the dome-shaped barrier section constructed as described above. FIG. 24 is a transparent view of the internal construction of the video camera in the barrier open state thereof. FIG. 25 is a transparent view of the internal construction of the video camera in the barrier closed state thereof. A video camera body 2301 contains the lens barrel 101, an image display device 2302, a control circuit board 2303, and so forth. Disposed in front of the built-in lens is the dome-shaped barrier section which is capable of opening/closing the front of the lens by the mechanism described hereinbefore.

The video camera of the present embodiment converts an image of an object captured by the built-in lens barrel 101 into signal charges by an image pickup element (not shown) disposed at a focal position of an optical system, i.e. at a location rearward of the lens barrel 101. The signal charges are converted into digital signals of luminance and color difference signals by an image processing circuit contained on the control circuit board 2303, and the digital video data obtained by the conversion is stored in a memory on the control circuit board 2303.

Then, the digital video data on the object, which is stored in the memory, is periodically read out following instructions from a control CPU on the control circuit board 2303 to be displayed in real time on a liquid crystal panel of the image display device 2302. Further, the video data is compressed, as required, to be recorded in a recording device mounted on the control circuit board 2303.

Figure 26:
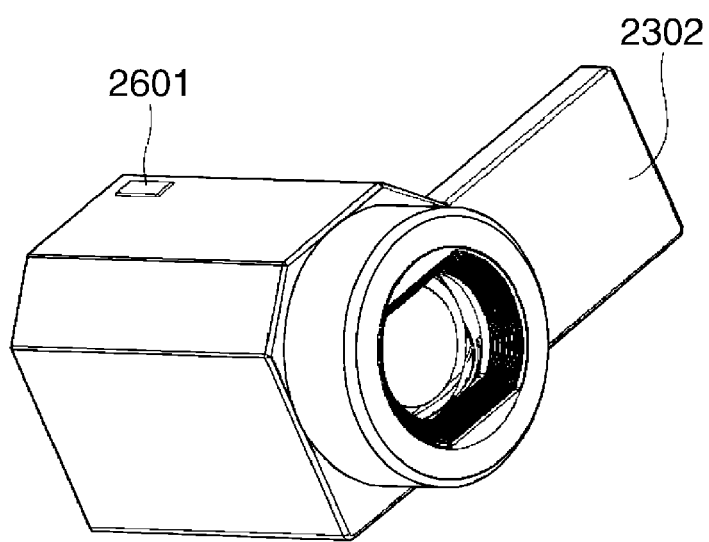
FIG. 26 is a perspective view of the appearance of the video camera as viewed from the front thereof.
Figure 27:
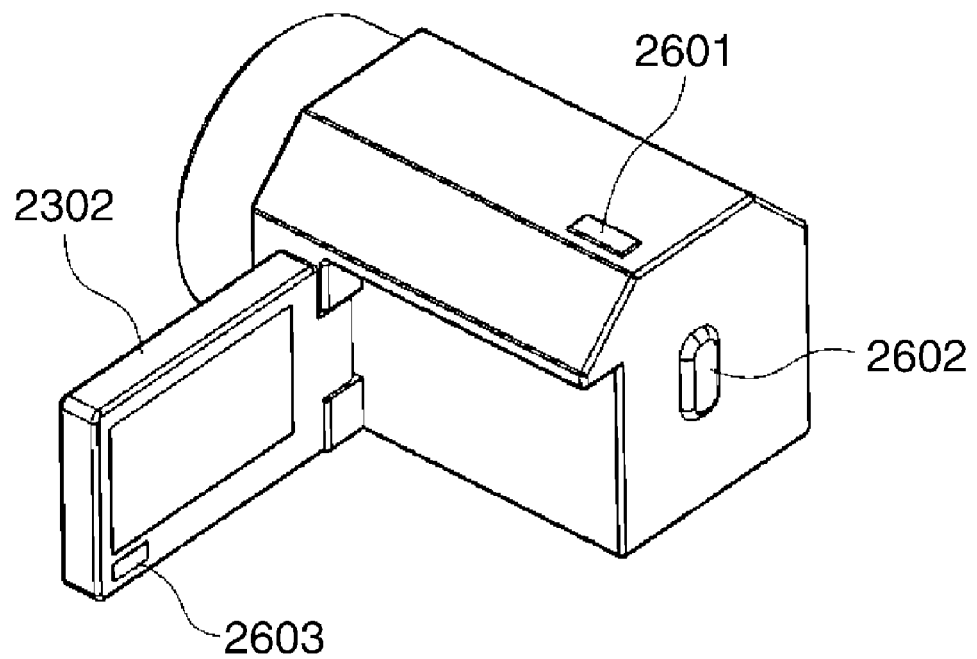
FIG. 27 is a perspective view of the appearance of the video camera as viewed from the rear thereof.
Figure 28A:
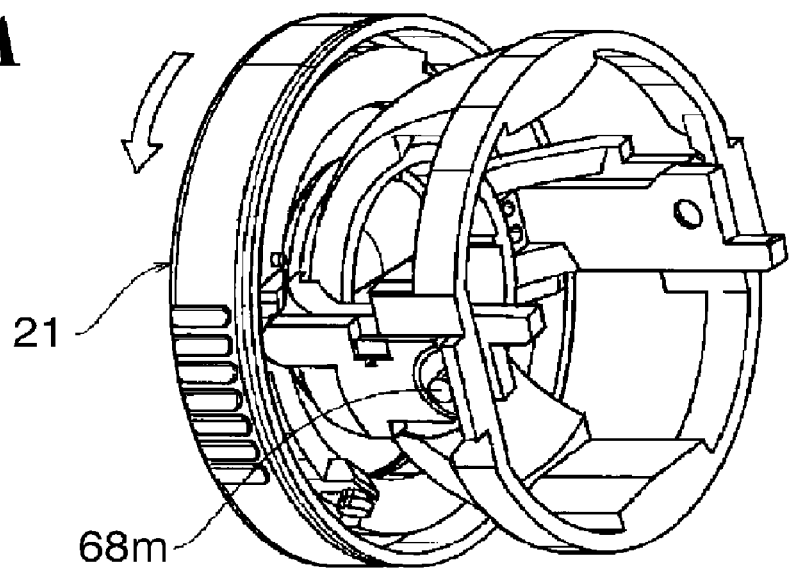
FIGS. 28A and 28B are perspective views of a conventional barrier mechanism.
Figure 28B:
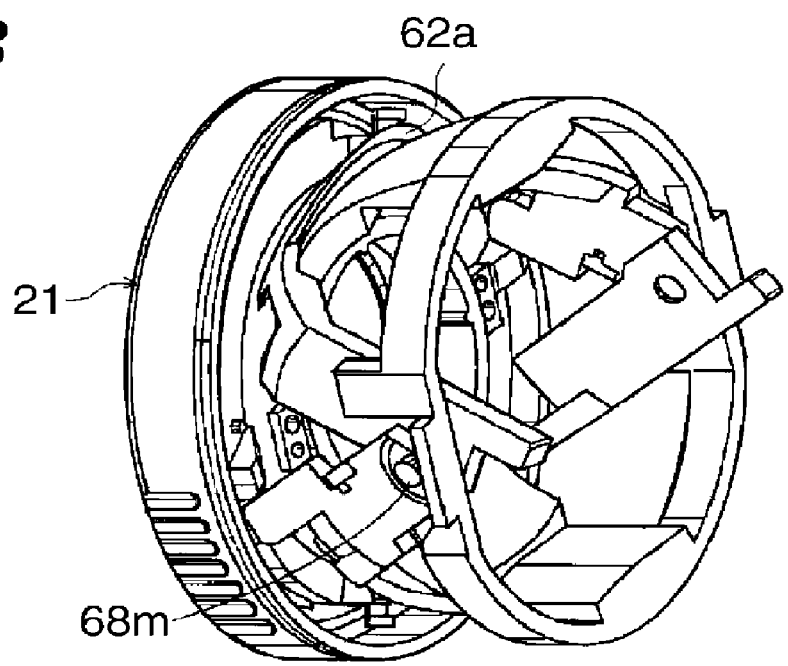

FIG. 26 is a perspective view of the appearance of the video camera as viewed from the front thereof. FIG. 27 is a perspective view of the appearance of the video camera as viewed from the rear thereof. A power button 2601 is provided on an upper surface of the video camera, and a trigger button 2602 is provided on a rear surface of the same. Whenever the power button 2601 is pressed, the power of the video camera is switched on or off. Further, whenever the trigger button 2602 is pressed, it is possible to start or terminate recording.

On the image display device 2302, there is provided a shooting/reproduction switching button 2603. Whenever the shooting/reproduction switching button 2603 is pressed, mode switching is performed between a shooting mode of the video camera and a reproduction mode for enabling check on picked-up video images.

The barrier section of the present embodiment can be opened/closed by the barrier mechanism described hereinbefore. Whenever the shooting/reproduction switching button 2603 is pressed after the power having been turned on by depression of the power button 2601, an electric signal is sent from the control circuit board 2303 to the motor 2001, and a barrier opening/closing operation is performed. Particularly, the video camera of the present embodiment is controlled such that the barrier section is held in its closed state in modes other than the shooting mode in the power-on state.

According to the image pickup apparatus of the present embodiment, each of the central barriers is driven to rotate about the associated barrier rotary shaft, and the associated outer barrier following the rotation of the central barrier rotates about the barrier rotary shaft in the same direction in a state having the central barrier superposed thereon. This makes it possible to save space in the barrier section in the barrier open state of the video camera. Further, since it is not required to provide a rotary ring on the front face of the lens barrel, it is possible to increase the degree of freedom in layout, which contributes to size reduction.

Further, since the upper barrier group rotates about the upper barrier rotary shaft and the lower barrier group rotates about the lower barrier rotary shaft, it is possible to reduce thickness of the video camera along the rotary shafts, which also contributes to size reduction.

Further, the upper barrier group and the lower barrier group are rotated in the respective opposite directions by the drive section and associated components, which facilitates the opening/closing of the barrier section.

Further, since each of the outer barriers located more remote from the optical axis rotates in accordance with the rotation of the associated central barrier located closer to the optical axis, it is possible to open and close the barrier section smoothly.

Further, since the barrier section has a generally-domed shape, it is possible not only to protect the front of the lens barrel securely, but also to achieve space saving.

Further, each of the central barriers has a front surface thereof curved with the center of curvature located at one point on the optical axis, which makes it possible to prevent a recess from being formed in the central part of the front surface of the barrier section to thereby make the appearance in the barrier closed state of the video camera look natural.

Further, the central barriers located closer to the optical axis are configured to be positioned closer to an object than the outer barriers located outward of the central barriers with respect to the optical axis are, and therefore even when a load is applied to a portion of the barrier section near the lens center in the barrier closed state, the barrier section can receive the load by two barriers. This makes it possible to protect the lens more securely.

Further, since each of the outer barriers has the outer end thereof formed with the rib having a height approximately equal to the thickness of the central barrier, it is possible to hide the clearance to thereby make the appearance look nice.

It should be noted that the present invention is not limited to the arrangement of the above-described embodiment, but any suitable arrangement may be employed insofar as it can attain the functions of the embodiment.

For example, although in the above-described embodiment, each of the upper and lower barrier groups has the spur gear with the center of rotation identical to the axis of the barrier rotary shaft, only one of the upper and lower barrier groups may have the spur gear configured as above.

Further, although in the above-described embodiment, the barrier groups vertically open and close when the video camera is set in its normal position, this is not limitative, but the present invention can also be applied to a construction in which the barrier groups open and close laterally, for example.

Although in the above-described embodiment, the image pickup apparatus is described by taking the video camera as an example, the present invention is also applicable to a film camera, a digital video camera, a digital SLR (single-lens reflex camera), etc. Further, the present invention can be applied not only to the above-mentioned image pickup apparatus, but also to various kinds of optical apparatuses including a monitoring apparatus, a telescope, and a microscope.

Further, in the above-described embodiment, the lens barrel is integrally built in the video camera body to form the video camera, but the lens barrel may be included in a lens device that can be removably attached to the body of an optical apparatus, such as an image pickup apparatus.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-327911, filed Dec. 24, 2008, which is hereby incorporated by reference herein in its entirety.

What is claimed is:

1. An image pickup apparatus including a lens barrel, and a barrier section for opening and closing a front face of the lens barrel, comprising:
a barrier rotary shaft disposed on a plane perpendicular to an optical axis of the lens barrel,
wherein the barrier section comprises:
a first driven barrier configured to be driven for rotation about said barrier rotary shaft; and
a second driven barrier configured to rotate about said barrier rotary shaft in a direction identical to a direction of rotation of said first driven barrier in accordance with the rotation of said first driven barrier such that said first driven barrier and said second driven barrier are superposed one upon the other.

2. The image pickup apparatus according to claim 1, wherein said barrier rotary shaft includes a first barrier rotary shaft, and a second barrier rotary shaft different from said first barrier rotary shaft,
wherein said barrier section includes a first barrier group for rotation about said first barrier rotary shaft and a second barrier group for rotation about said second barrier rotary shaft, and
wherein at least one of said first barrier group and said second barrier group includes said first driven barrier and said second driven barrier.

3. The image pickup apparatus according to claim 2, comprising a driving device configured to cause said first barrier group and said second barrier group to rotate in opposite directions about said first barrier rotary shaft and said second barrier rotary shaft, respectively.

4. The image pickup apparatus according to claim 1, wherein said first driven barrier is located closer to the optical axis, and said second driven barrier is located more remote from the optical axis than said first driven barrier is.

5. An image pickup apparatus according to claim 1, wherein said barrier section is generally dome-shaped.

6. The image pickup apparatus according to claim 4, wherein said first driven barrier located closer to the optical axis has a front surface thereof curved with a center of curvature at a point on the optical axis.

7. The image pickup apparatus according to claim 4, wherein said first driven barrier located closer to the optical axis is positioned closer to an object than said second driven barrier located more remote from the optical axis.

8. The image pickup apparatus according to claim 4, wherein said second driven barrier located more remote from the optical axis has an end thereof formed with a rib having a height approximately equal to a thickness of said first driven barrier.

9. A lens device that is used in an optical apparatus, and includes a lens barrel, and a barrier section for opening and closing a front face of the lens barrel, comprising:
a barrier rotary shaft disposed on a plane perpendicular to an optical axis of the lens barrel,
wherein the barrier section comprises:
a first driven barrier configured to be driven for rotation about said barrier rotary shaft; and
a second driven barrier configured to rotate about said barrier rotary shaft in a direction identical to a direction of rotation of said first driven barrier in accordance with the rotation of said first driven barrier such that said first driven barrier and said second driven barrier are superposed one upon the other.

* * * * *